United States Patent Office 2,954,319
Patented Sept. 27, 1960

2,954,319
METHOD OF COMBATING RED SPIDER MITES BY MEANS OF A TRICHLORO-DIPHENYL-SULPHONE

Jan Hendrik Uhlenbroek and Jacques Meltzer, Van Houtenlaan, Netherlands, assignors to North American Philips Company, Inc., New York, N.Y., a corporation of Delaware No Drawing. Filed Apr. 25, 1958, Ser. No. 730,811

Claims priority, application Netherlands May 1, 1957

4 Claims. (Cl. 167—30)

It has been proposed to combat noxious organisms and development stages thereof, living on plants, by using a compound of the general formula: Ar—X—R, wherein Ar designates an aromatic radical, which has, at least at the para-position, a carbon-free substituent not forming a salt, R denotes an organic radical and X a sulphur group or a sulphur-containing group, on the understanding that R and Ar are bound directly to sulphur. These compounds could be used particularly for those noxious organisms which need non-keratiniferous food. The said compounds would not be used particularly for combating moth caterpillars. With this known group of insecticides are associated inter alia trihalogen-diphenylsulphones, for instance, the trichloro-diphenylsulphones of the formula: 2.4.4' - trichloro-diphenylsulphone and 3.4.4'-trichloro-diphenylsulphone.

It is furthermore known that certain polyhalogen-diphenylsulphones may be employed for combating red spider mites or their development stages. Mention may particularly be made of the trihalogendiphenylsulphone of the formula 2.4.5-trichloro-diphenylsulphone.

It has now been found that the compound of the formula 2.4.4'-trichloro-diphenylsulphone of the aforesaid trichloro-diphenylsulphones is the most active compound for combating red spider mites.

In accordance herewith the invention relates to a method of producing a means for combating mites, particularly the development stages thereof and is characterized in that a compound of the formula: 2.4.4'-trichloro-diphenylsulphone is mixed with a solid carrier or dissolved or dispersed in a liquid carrier, if desired with the addition of surface-active substances, dispersion agents and/or adhesives.

The compound according to the invention may be processed in a conventional manner to obtain a combating agent.

To this end these compounds are mixed solid or liquid carriers or, as the case may be, dissolved therein and, if desired, enriched with dispersion agents, emulsifiers or wetting agents. Preparations thus obtained may be sprayed, pulverized or nebulized in air, either as such or as emulsions or dispersions in a liquid, for example, in water. Of the various employable preparations for which the active compounds can be used, may be mentioned in particular the so-called mixable oils, spray powders or dustible powders. These forms are referred to only by way of example and should not restrict the invention.

In order to produce mixable oils the active compound is dissolved in a suitable solvent, which is poorly mixable with water, to which solution is added an emulsifier. Suitable solvents are, for example, xylene, toluene, dioxane, petroleum distillates rich in aromatic compounds for instance: solvent naphtha, distilled tar oil, furthermore tetraline, cyclohexane, or mixtures thereof. As emulsifiers may be used alkyl-phenoxy-polyglycol ethers, polyoxy-ethylene-sorbitane esters of fatty acids or polyoxy-ethylene-sorbitol esters of fatty acids. A plurality of this kind of emulsifiers are known under the trademark of "Triton," "Tween" and "Atlox."

The concentration of the active compound in the liquid mixable with water is not subjected to narrow limits. It may vary, for example, between 2 and 50% by weight. Prior to use the mixable oils are emulsified in water, which emulsion is sprayed out. As a rule, the concentration of the active compound in these aqueous emulsions lies between 0.01 and 0.5% by weight.

The spray powders may be produced by mixing the active compound with a solid, inert carrier material and by grinding, as a rule in the presence of a dispersion agent and/or a wetting agent. Prior to use, the spraying powders are dispersed in a liquid, preferably in water, which dispersion is volatilized. It is important for the spraying powder to consist of small particles in order to prevent obturation of the volatilizer during use. It is therefore advisable to use, as a carrier material, a fine powdery material. If desired, the mixture of carrier material active compound and auxiliary substances, if any, is ground.

As a carrier material may be used, for example, alumina, diatomaceous earth, kaolin, dolomite, talcum, gypsum, chalk, bentonite, attapulgite, infusorial earth, celite, wood flour, tobacco dust or ground coconut shells. Suitable dispersion agents are: lignine sulphonates and naphthalene sulphonates. As wetting agents may be used fatty-alcohol sulphates, alkyl-arylsulphonates or fatty-acid condensation products, for example those known under the trade name of "Igepon."

Also with the spraying powders the concentration of active compounds is not subjected to narrow limits. In general, the concentration will be chosen between 10 and 80% by weight.

Dustible powders may be produced by applying an active compound as such or dissolved in a solvent to a solid carrier material. During the use the preparation thus obtained is sprayed into the air in a fine-powdery state. By choosing suitable, light carrier materials, these powders may, as an alternative, be produced by the method described for the production of spraying powders. As carrier material may be used the products mentioned above for the production of spraying powders. The concentration of active compounds in the dustible powders is, usually, lower than that in the spraying powders or mixable oils, but higher than the concentration of the active compounds in dispersions or emulsions obtained by diluting the spraying powders or the mixable oils with liquids. The dustible powders frequently contain 1 to 20% by weight of active compound. It may be superfluous to observe that the mixable oils, the spraying or dustible powders according to the invention may be produced by mixing two mixable oils (or spraying powders and dustible powders), each of which contains one of the active compounds.

The experiments which proved the quite satisfactory effect of the 2.4.4'-trichloro-diphenylsulphone were carried out as follows.

A compound to be tested was suspended in water or emulsified therein. Then bean plants, each having two leaves, were immersed in the suspension or the emulsion. After the suspension or the emulsion had dried on the plants, the plants were infected with female red spider in order to obtain eggs on the leaves. After two days the female spiders were removed.

With a second test series two-leaved bean plants were infected with female red spider in order to obtain eggs on the leaves. Again after two days the female spiders were removed, after which the plants with the eggs were immersed in the suspension or the emulsion of the compound to be tested.

With the two test series the kill of eggs, larvae and nymphs was determined eight days after the removal of the female red spiders. The oldest eggs then had a lifetime of 10 days, the youngest one of eight days.

From check tests it was found that the kill of eggs and larvae on untreated plants is low, i.e. usually lower than 3%, seldom more than 5% and never more than 10%. In the kill percentages referred to in the following table the check kill is calculated in accordance with Abbott's formula:

$$\frac{ab}{a} \times 100$$

wherein $a$ designates the number of surviving spider individuals of the check and $b$ the number of surviving individuals of the treated series.

The results of the tests carried out with the aforesaid substances are compiled in the following table. In the first column are indicated the aforesaid trichlorodiphenylsulphones, in the second column the tested concentrations in mg./litre (p.p.m.). The kill percentages of the first test series are given in the columns 6 to 8 under the heading: "Eggs deposited on residue." The kill percentages of the second test series are indicated in the column 3 to 5 under the heading "Emulsion or suspension dried on eggs."

$E$ = percentage of killed eggs
$L$ = percentage of killed larvae and nymphs
$T$ = percentage of total kill of 99% is attained, which percentage is not reached with the other compounds of the same concentration.

In the following example the production of 2.4.4'-diphenyl-sulphone is described.

*Example*

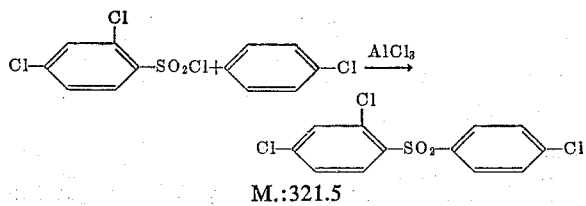

M.:321.5

19 gs. of 2.4-dichloro-benzene-sulphochloride (0.077 mol) was heated with 9.56 gs. of chloro-benzene (0.085 mol) and 10.7 gs. of aluminium chloride (0.8 mol) at 120° C., whilst stirring.

After the hydrochloric acid production had terminated, stirring was continued for further twenty minutes, after which the solution was cooled and poured out in water. After some time the deposit obtained was filtered off, dried and recrystallized from benzene. Thus 18 gs. (72%) of 2.4.4'-trichloro-diphenylsulphone with a melting point of 134 to 135° C. was obtained.

What is claimed is:

1. A method of destroying red spider mites particularly in their developmental stages comprising contacting said mites with an acaracidal composition containing an acaracidally effective amount of 2,4,4'-trichloro diphenyl sulfone and an inert carrier therefor.

2. A method of destroying red spider mites particularly in their developmental stages comprising contacting

| Trichloro-diphenylsulphones | Conc. (p.p.m.) | Emulsion or suspension dried on eggs | | | Eggs deposited on residue | | |
|---|---|---|---|---|---|---|---|
| | | E | L | T | E | L | T |
| 2,4,6-trichloro (Cl at 2,4 ring and other ring unsubstituted, sulfone) | 1,000<br>300<br>100 | 8<br>3<br>3 | 100<br>100<br>70 | 100<br>100<br>71 | 95<br>89<br>61 | 100<br>77<br>44 | 100<br>96<br>78 |
| 2,4,4'-trichloro | 300<br>100<br>30<br>10 | 55<br>25<br>3<br>1 | 79<br>98<br>90<br>58 | 90<br>99<br>90<br>59 | 100<br>91<br>24<br>22 | ------<br>85<br>62<br>32 | 100<br>99<br>71<br>47 |
| 2,6,4'-trichloro | 1,000<br>300<br>100 | 8<br>0<br>2 | 68<br>29<br>4 | 71<br>29<br>6 | 13<br>25<br>9 | 9<br>23<br>3 | 22<br>37<br>12 |
| 2,4,4'-trichloro (isomer) | 1,000<br>300<br>100 | 8<br>2<br>1 | 100<br>98<br>46 | 100<br>98<br>46 | 79<br>49<br>16 | 98<br>66<br>38 | 99<br>73<br>43 |
| 2,2',4,4'-tetrachloro | 1,000 | ------ | ------ | <50 | ------ | ------ | <50 |

From these data it can be concluded that, with the compound of the formula 2.4.4'-trichloro-diphenylsulphone, at a concentration of 100 p.p.m., both with the eggs deposited on residue and with the eggs on which the test solution or emulsion has dried, even a kill percentage said mites with an acaracidal composition containing an acaracidally effective amount of 2,4,4'-trichloro diphenyl sulfone, an emulsifier and an inert carrier therefor.

3. A method of destroying red spider mites particularly in their developmental stages comprising contacting said mites with an acaracidal composition containing an acaracidally effective amount of 2,4,4'-trichloro diphenyl sulfone, an emulsifier and an inert solid carrier therefor.

4. A method of destroying red spider mites particularly in their developmental stages comprising contacting said mites with an acaracidal composition containing an acaracidally effective amount of 2,4,4'-trichloro diphenyl sulfone, an emulsifier and an inert liquid carrier therefor.

References Cited in the file of this patent

UNITED STATES PATENTS 2,812,281    Meltzer _____ Nov. 5, 1957

OTHER REFERENCES

King: U.S. Dept. of Agr. Handbook No. 69, p. 320, May 1954, item No. 10225.